US011338328B2

(12) United States Patent
Doi et al.

(10) Patent No.: US 11,338,328 B2
(45) Date of Patent: May 24, 2022

(54) METHOD FOR REFORMING COAL ASH, AND METHOD FOR PRODUCING FLY ASH FOR CONCRETE ADMIXTURE

(71) Applicant: MITSUBISHI MATERIALS CORPORATION, Chiyoda-ku (JP)

(72) Inventors: Koota Doi, Tokyo (JP); Makio Yamashita, Chichibu-gun (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 474 days.

(21) Appl. No.: 16/484,327

(22) PCT Filed: Feb. 8, 2018

(86) PCT No.: PCT/JP2018/004375
§ 371 (c)(1),
(2) Date: Aug. 7, 2019

(87) PCT Pub. No.: WO2018/147360
PCT Pub. Date: Aug. 16, 2018

(65) Prior Publication Data
US 2020/0030853 A1 Jan. 30, 2020

(30) Foreign Application Priority Data
Feb. 10, 2017 (JP) .............................. JP2017-023389

(51) Int. Cl.
*C04B 18/06* (2006.01)
*C04B 18/08* (2006.01)
*B07B 7/083* (2006.01)
*C04B 18/10* (2006.01)
*C04B 7/34* (2006.01)
*C04B 7/00* (2006.01)
*C04B 28/00* (2006.01)
*C04B 32/00* (2006.01)
*C04B 14/00* (2006.01)

(52) U.S. Cl.
CPC .............. *B07B 7/083* (2013.01); *C04B 18/08* (2013.01); *C04B 18/10* (2013.01)

(58) Field of Classification Search
USPC ........................................ 106/638, 705, 709
See application file for complete search history.

(56) References Cited

U.S. PATENT DOCUMENTS 9,067,824 B1 * 6/2015 Hansen ................ C04B 40/0039
2021/0017076 A1 * 1/2021 Omura .................... C04B 28/04

FOREIGN PATENT DOCUMENTS

| CN | 1583293 A | 2/2005 |
|---|---|---|
| CN | 201684726 U | 12/2010 |
| CN | 102584060 A | 7/2012 |
| CN | 106064150 A | 11/2016 |
| JP | 57-145066 A | 9/1982 |
| JP | 7-4632 A | 1/1995 |
| JP | 7-165455 A | 6/1995 |
| JP | 9-2848 A | 1/1997 |
| JP | 10-59755 A | 3/1998 |
| JP | 11-262749 A | 9/1999 |
| JP | 2001-121084 A | 5/2001 |
| JP | 2001-179134 A | 7/2001 |
| JP | 2006-181895 A | 7/2006 |
| JP | 2006-315896 A | 11/2006 |
| JP | 2010-30885 A | 2/2010 |
| JP | 2011-133344 A | 7/2011 |
| JP | 2012-505150 A | 3/2012 |
| JP | 2014-196240 A | 10/2014 |
| JP | 2016-60673 A | 4/2016 |
| JP | 2016-113319 A | 6/2016 |
| JP | 2016-527328 A | 9/2016 |
| JP | 2017-124343 A | 7/2017 |
| JP | 6278148 B1 | 2/2018 |
| WO | WO 2010/042838 A2 | 4/2010 |
| WO | WO 2010/042838 A3 | 4/2010 |
| WO | WO 2014/181133 A2 | 11/2014 |
| WO | WO 2014/181133 A3 | 11/2014 |

OTHER PUBLICATIONS

Japanese Office Action dated Dec. 16, 2019 in Patent Application No. 2017-023389 (with partial English translation), 25 pages.
Shigekatsu Mori, et al., "Development of a Coal Fly Ash Reforming Process" Journal of Chemical Engineering, vol. 20, No. 4, 1994, pp. 463-467 (with partial English translation, literature previously filed).
Fumio Nakagawa, et al., "Micron Separator, its Features and Applications" Journal of the Society of Powder Technology, Japan, vol. 12, No. 11, 1975, pp. 633-637, (with partial English translation).
"Coal Ash Effective Utilization Technology Aiming for Recycling-Oriented Society" Edited by Japan Society of Civil Engineers, Sep. 2003, pp. 46-49, (with partial English translation).
Combined Chinese Office Action and Search Report dated Feb. 3, 2021 in corresponding Chinese Patent Application No. 201880007319.3 (with English Translation of Search Report Only), 10 pages.
International Search Report dated May 15, 2018 in PCT/JP2018/004375 filed on Feb. 8, 2018.
Kozawa, "Elucidation and improvement of performance of gas phase dispersion and classification mechanism of fine particles," Doctoral dissertation, Material Science Major, Natural Sciences of Kanazawa University Graduate School, Jan. 2012, 101 total pages (with partial English translation).

(Continued)

*Primary Examiner* — James E McDonough
(74) *Attorney, Agent, or Firm* — Oblon, McClelland, Maier & Neustadt, L.L.P.

(57) ABSTRACT

The present invention provides a method for reforming coal ash, including classifying coal ash having 10% by mass or more of a residue on a 45 μm sieve by using a forced vortex centrifugal type classifying apparatus, under a condition that the residue on a 45 μm sieve of the coal ash after the classifying becomes in a range of 1% by mass or more and 8% by mass or less.

5 Claims, No Drawings

(56) References Cited

OTHER PUBLICATIONS

Gotoh, K. et al., "The Dispersion Mechanism of a Mixer-type Disperser," Journal of the Society of Powder Technology, vol. 29, No. 1, 1992, pp. 11-17 (with English Abstract).

Doi, et al., "Influence of various factors on fly ash and coloration of coal ash," Mitsubishi Materials Cement Research Institute, Research report No. 18, 2017, Jan. 5, 2017, pp. 8-13, 8 total pages (with partial English translation).

Lee, S. H. et al., "Properties of Classified Fly Ashes by Using of Electrostatic Precipitator and the Modification of Fly Ashes by the Removal of Carbon," J. Soc. Mat. Sci. Japan, vol. 48, No. 8, 1999, pp. 837-842 (with English Abstract).

Kozawa, "Development of a Spiral-flow Classifier," Funtai Gijutsu, vol. 3, No. 9, 2011, p. 60-64, 7 total pages (with partial English translation).

Mori, S. et al., "Development of a Coal Fly Ash Reforming Process," Journal of Chemical Engineering, vol. 20, No. 4, 1994, pp. 463-467 (with English Abstract).

Doi, K. et al., "Characteristics of Fly Ash Adjusted in Particle Size by Classification," Cement Science and Concrete Technology, vol. 71, p. 626-632 (with English Abstract).

Kanazu, T. "Revision of JIS A 6201: Fly ash for use in concrete," Concrete Journal, vol. 37, No. 8, p. 19-25, Aug. 1999 (with English Abstract).

Notification (Information Statement) dated Sep. 18, 2018 in Japanese Patent Application No. 2017-023389 (with English language translation).

Notification (Information Statement) dated Oct. 23, 2018 in Japanese Patent Application No. 2017-023389 (with English language translation).

Notification (Information Statement) dated Nov. 6, 2018 in Japanese Patent Application No. 2017-023389 (with English language translation).

Notice of Reasons for Rejection dated Dec. 21, 2018 in Japanese Patent Application No. 2017-023389 (with English language translation).

Notification (Information Statement) dated Jan. 8, 2019 in Japanese Patent Application No. 2018-129499 (with English language translation).

Notice of Allowance dated Jun. 18, 2019 in Japanese Patent Application No. 2017-023389 (with English language translation).

Notice of Reasons for Rejection dated Jun. 18, 2019 in Japanese Patent Application No. 2018-129499 (with English language translation).

\* cited by examiner

METHOD FOR REFORMING COAL ASH, AND METHOD FOR PRODUCING FLY ASH FOR CONCRETE ADMIXTURE

TECHNICAL FIELD

The present invention relates to a method for reforming coal ash and a method for producing fly ash for a concrete admixture.

Priority is claimed on Japanese Patent Application No. 2017-023389, filed on Feb. 10, 2017, the content of which is incorporated herein by reference.

BACKGROUND ART

It is studied to use coal ash (also referred to as fly ash) generated in a coal-fired thermal power plant, a fluidized bed combustion furnace, or the like as a concrete admixture. Fly ash for a concrete admixture is defined in Japanese Industrial Standard JIS A 6201 (fly ash for use in concrete). The coal ash generated in the coal-fired thermal power plant or the fluidized bed combustion furnace is usually classified by a classifying apparatus and then used as the fly ash for a concrete admixture.

As a method of classifying coal ash, Patent Document 1 describes a method of using a low pressure classifying apparatus or a multi-stage cyclone (free vortex centrifugal type classifying apparatus). In addition, Patent Document 2 discloses a method of reforming fly ash by combining preliminary classification and pulverization.

CITATION LIST

Patent Literature

[Patent Document 1] Japanese Unexamined Patent Application, First Publication No. 2016-60673
[Patent Document 2] Japanese Unexamined Patent Application, First Publication No. 2014-196240

SUMMARY OF INVENTION

Technical Problem

However, coal ash generally contains unburned carbon, and the unburned carbon may adsorb a chemical admixture of concrete. Therefore, when coal ash having a large amount of the unburned carbon is used as an admixture for concrete, it may be necessary to increase an addition amount of other chemical admixtures, or fluidity of the concrete may fluctuate. In addition, a black spot due to the unburned carbon may be generated on a surface of the concrete, and an appearance of hardened concrete may deteriorate. Therefore, in order to use the coal ash as the fly ash for a concrete admixture, it is necessary to reduce the amount of unburned carbon in the coal ash. In JIS A 6201 (fly ash for use in concrete), ignition loss (ig. loss) including the amount of the unburned carbon is limited.

However, since the unburned carbon in the coal ash adheres to coal ash particles to form aggregated particles, there is a problem that it is difficult to selectively remove only the unburned carbon. That is, in the low pressure classifying apparatus or the multi-stage cyclone described in Patent Document 1, there are concerns that it is difficult to selectively remove the aggregated particles containing the unburned carbon, and a recovery rate of coal ash from which the unburned carbon is removed is low. In addition, in the method of combining the preliminary classification and the pulverization described in Patent Document 2, the unburned carbon is refined, and an adsorption amount of other admixtures such as AE (air-entraining) admixture is larger than that of coal ash (raw powder) before the classification.

The present invention was made in view of the above-mentioned circumstances, and an object thereof is to provide a method for reforming coal ash capable of efficiently reducing the amount of unburned carbon in coal ash. In addition, another object of the present invention is to provide a method for efficiently producing fly ash for a concrete admixture from coal ash.

Solution to Problem

In order to achieve the object, according to an aspect of the present invention, there is provided a method for reforming coal ash, including classifying coal ash having 10% by mass or more of a residue on a 45 μm sieve by using a forced vortex centrifugal type classifying apparatus, under a condition that the residue on a 45 μm sieve of the coal ash after the classifying becomes in a range of 1% by mass or more and 8% by mass or less.

According to the method for reforming coal ash according to the aspect of the present invention configured as described above, in the coal ash after the classifying (after reforming), the residue on a 45 μm sieve decreases to be in a range of 1% by mass or more and 8% by mass or less. According to studies by the present inventors, there is a high possibility that unburned carbon in coal ash adheres to coal ash particles to form aggregated particles each having a particle diameter of 45 μm or more. Accordingly, the coal ash obtained by the method for reforming coal ash according to the aspect of the present invention, has a small content of the unburned carbon, and in a case of using this as a concrete admixture, it is difficult to generate a black spot. In addition, since the obtained coal ash mainly includes fine coal ash particles each having a particle diameter of 45 μm or less, in a case of using this as an admixture for concrete, an activity increases.

In addition, in the method for reforming coal ash according to the aspect of the present invention, since the coal ash having 10% by mass or more of the residue on a 45 μm sieve is classified by using the forced vortex centrifugal type classifying apparatus, under the condition that the residue on a 45 μm sieve of the coal ash after the classifying becomes 1% by mass or more, as is apparent from results of Examples to be described later, a recovery rate of the coal ash in which a content of unburned carbon is reduced is high and the amount of unburned carbon in the coal ash can be efficiently reduced.

Here, in the method for reforming coal ash according to the aspect of the present invention, in the coal ash having 10% by mass or more of the residue on a 45 μm sieve (that is, coal ash before the classification), it is preferable that the residue on a 45 μm sieve is 40% by mass or less, a compression degree is 40% or less, a L value of lightness index in a Hunter Lab color system is 54.0 or more, and an ignition loss is 5.0% by mass or less.

In this case, in the coal ash before the classification, since the residue on a 45 μm sieve is 40% by mass or less and the compression degree is 40% or less, the recovery rate of the coal ash in which the content of unburned carbon is reduced is high, and the amount of the unburned carbon in the coal ash can be efficiently reduced. In addition, since the L value of lightness index in the Hunter Lab color system is 54.0 or more and the ignition loss is 5.0% by mass or less, the amount of unburned carbon of the obtained coal ash is further reduced. Therefore, it can be used advantageously as an admixture for concrete.

In addition, in the method for reforming coal ash according to the aspect of the present invention, it is preferable that the classifying is carried out under a condition that an index of classification accuracy ($\kappa=d25/d75$) becomes 0.6 or more and 0.7 or less.

In this case, since the index of classification accuracy is set to be high as 0.6 or more, the coal ash after the classifying has a narrow particle size distribution and uniform particle size. Therefore, segregation is difficult to occur during storage or mixing with other concrete materials. In addition, since the index of classification accuracy is set to be 0.7 or less, the recovery rate of the coal ash after the classifying increases, and the amount of unburned carbon in the coal ash can be more efficiently reduced.

Further, in the method for reforming coal ash according to the aspect of the present invention, it is preferable that the obtained coal ash has the ignition loss reduced by 8.0% or more, as compared to the ignition loss of the coal ash before the classification.

In this case, in the obtained coal ash, since the amount of unburned carbon is certainly reduced, it can be advantageously used as an admixture for concrete.

According to another aspect of the present invention, there is provided a method for producing fly ash for a concrete admixture, including: classifying coal ash, in which a residue on a 45 μm sieve is in a range of 10% by mass or more and 40% by mass or less, a compression degree is 40% or less, a L value of lightness index in a Hunter Lab color system is 54.0 or more, and an ignition loss is 5.0% by mass or less, by using a forced vortex centrifugal type classifying apparatus, under a condition that the residue on a 45 μm sieve of the coal ash after the classifying becomes in a range of 1% by mass or more and 8% by mass or less.

According to the method for producing fly ash for a concrete admixture according to the aspect of the present invention configured as described above, since the obtained coal ash (fly ash) contains a small amount of unburned carbon and large amount of fine coal ash particles each having a particle diameter of 45 μm or less, in a case of using this as an admixture for concrete, a black spot is less likely to be generated, and an activity index is high. Further, since the forced vortex centrifugal type classifying apparatus is used as a classifying apparatus, the recovery rate of the coal ash after the classifying is high. Accordingly, according to the method for producing fly ash for a concrete admixture according to the aspect of the present invention, it is possible to efficiently produce coal ash (fly ash) useful as an admixture for concrete.

Advantageous Effects of Invention

According to the present invention, it is possible to provide a method for reforming coal ash capable of efficiently reducing the amount of unburned carbon in coal ash. In addition, it is possible to provide a method capable of efficiently producing fly ash for a concrete admixture from coal ash.

DESCRIPTION OF EMBODIMENTS

Hereinafter, a method for reforming coal ash and a method for producing fly ash for a concrete admixture according to the present embodiment of the present invention will be described.

Coal ash used in the present embodiment is ash produced by burning coal used as fuel for thermal power generation or a fluidized bed combustion furnace. Coal ash obtained by reforming method of the present embodiment can be advantageously used, for example, as an admixture for concrete.

In the method for reforming coal ash and the method for producing fly ash for a concrete admixture according to the present embodiment of the present invention, predetermined coal ash is classified by using a forced vortex centrifugal type classifying apparatus, under a condition that a residue on a 45 μm sieve of the coal ash after the classifying becomes in a range of 1% by mass or more and 8% by mass or less.

In coal ash before the classification to be used in the present embodiment, the residue on a 45 μm sieve is 10% by mass or more. In the coal ash before the classification, it is preferable that the residue on a 45 μm sieve is in a range of 10% by mass or more and 40% by mass or less, a compression degree is 40% or less, a L value of lightness index in a Hunter Lab color system is 54.0 or more, and an ignition loss is 5% by mass or less. Hereinafter, the reason why the physical properties of the coal ash are set as described above in the present embodiment will be described.

The residue on a 45 μm) sieve is a residue remaining on a sieve when classified using a standard sieve of 45 μm aperture, and represents a content of particles each having a particle diameter of 45 μm or more. The particles each having a particle diameter of 45 μm or more included in the coal ash are aggregated particles formed in a manner that unburned carbon in coal ash adheres to coal ash particles to be aggregated, and usually are contained by 10% by mass or more in coal ash. When the residue on a 45 μm sieve exceeds 40% by mass, the amount of the residue on a 45 μm sieve to be removed by the classifying increases, and there is a concern that a recovery rate of coal ash after the classifying to be described later may be reduced.

Therefore, in the present embodiment, the residue on a 45 μm sieve is set in the range of 10% by mass or more and 40% by mass or less. The residue on a 45 μm sieve is more preferably in a range of 10% by mass or more and 20% by mass or less, but is not limited thereto.

The compression degree is a value defined by the following equation.

Compression degree (%)={(Packed apparent specific gravity-Loose apparent specific gravity)/Packed apparent specific gravity}×100

The loose apparent specific gravity is a specific gravity of coal ash (Weight of coal ash/Volume of container) when a container having a predetermined volume is filled with coal ash by free fall. The packed apparent specific gravity is a specific gravity (Weight of coal ash/Volume of compressed coal ash) when coal ash with which a container is filled by free fall is compressed by tapping.

The compression degree tends to correlate with a fluidity of powder. When the compression degree exceeds 40%, there are concerns that the fluidity of coal ash may be lowered and the recovery rate of the coal ash after the classifying to be described later may be reduced.

Therefore, in the present embodiment, the compression degree is set to be 40% or less. It is preferable that the compression degree is in a range of 30% or more and 40% or less.

The L value of lightness index in the Hunter Lab color system represents lightness, and indicates that as the L value is larger, it is closer to white, that is, the mix amount of black substances such as unburned carbon decreases. if the L value of lightness index in the Hunter Lab color system is less than 54.0, when adding the coal ash after performing the classifying to be described later to concrete as an admixture, there is a concern that a black spot is likely to be generated, in concrete to be obtained.

Therefore, in the present embodiment, the L value of lightness index in the Hunter Lab color system is set to be 54.0 or more. It is preferable that the L value of lightness index is in a range of 54.0 or more and 70.0 or less.

The ignition loss indicates the amount of unburned carbon contained in coal ash. If the ignition loss exceeds 5.0% by mass, when adding the coal ash after performing the classifying to be described later to concrete as an admixture, there is a concern that a black spot is likely to be generated, in concrete to be obtained.

Therefore, in the embodiment, the ignition loss is set to be 5.0% by mass or less. It is preferable that the ignition loss is in a range of 1.0% by mass or more and 5.0% by mass or less. The ignition loss is more preferably in a range of 1.0% by mass or more and 3.0% by mass or less, but is not limited thereto.

In the present embodiment, the coal ash is classified by using the forced vortex centrifugal type classifying apparatus.

As a classifying apparatus, a centrifugal type classifying apparatus that performs classification by using a centrifugal force of particles and an inertia type classifying apparatus that performed classification by using an inertial force of particles are known. Further, as the centrifugal type classifying apparatus, a forced vortex type, a semi-free vortex type, a free vortex type, and the like are known. The forced vortex type classifying apparatus is a classifying apparatus which includes a rotating body (also referred to as a classification rotor) inside the apparatus, and forms a vortex forcibly by rotating the rotating body at a high speed. The semi-free vortex type classifying apparatus is a classifying apparatus which includes a guide plate (also referred to as a slit) for generating a vortex inside the apparatus, instead of the rotating body. The free vortex type classifying apparatus is a classifying apparatus which blows a gas in a tangential direction inside the apparatus to generate a vortex, as typified by a cyclone.

Among the classifying apparatuses, in the forced vortex centrifugal type classifying apparatus, a particle diameter of powder after the classifying can be precisely controlled by adjusting the number of rotations of the rotating body. Therefore, in the present embodiment, the forced vortex centrifugal type classifying apparatus is used.

In the present embodiment, classification is performed by using the forced vortex centrifugal type classifying apparatus, under a condition that the residue on a 45 μm sieve of the coal ash after the classifying becomes in a range of 1% by mass or more and 8% by mass or less.

When the residue on a 45 μm sieve is set to a high value exceeding 8% by mass, there is a concern that a removal efficiency of unburned carbon may be reduced. On the other hand, when the residue on a 45 μm sieve is set to a low value of less than 1% by mass, there is a concern that the recovery rate of coal ash after the classifying may be excessively reduced.

Therefore, in the present embodiment, a classification condition is set as a condition that the residue on a 45 μm sieve of coal ash after the classifying is in a range of 1% by mass or more and 8% by mass or less. The residue on a 45 μm sieve of coal ash after the classifying is preferably in a range of 1% by mass or more and 5% by mass or less, but is not limited thereto.

In addition, in the present embodiment, classification using the forced vortex centrifugal type classifying apparatus is carried out under a condition that the index of classification accuracy K becomes 0.6 or more and 0.7 or less. Here, the index of classification accuracy K is a ratio between a particle diameter (d25, unit: μm) when a partial classification efficiency becomes 25% and a particle diameter (d75, unit: μm) when the partial classification efficiency becomes 75%, in a partial classification efficiency curve, and is a value obtained by the following equation.

$$\kappa = d25/d75$$

As the index of classification accuracy is closer to 1, it means that the particle size distribution is narrower and the particle diameter is more uniform.

Since segregation is difficult to occur during storage or mixing with other concrete materials, the coal ash after the classifying having a narrow particle size distribution and uniform particle size is preferable. Accordingly, the index of classification accuracy κ is preferably close to 1, whereas when the index of classification accuracy κ approaches 1 too much, the recovery rate of coal ash after the classifying becomes too low.

Therefore, in the present embodiment, the classification condition is set as a condition that the index of classification accuracy κ becomes 0.6 or more and 0.7 or less.

According to the method for reforming coal ash according to the present embodiment configured as described above, in the coal ash after the classifying (after reforming), the residue on a 45 μm sieve decreases to be in a range of 1% by mass or more and 8% by mass or less.

In addition, the obtained coal ash usually has the ignition loss reduced by 8.0% or more, as compared to the ignition loss of the coal ash before the classification. Accordingly, since the coal ash obtained by the method for reforming coal ash of the present embodiment has a small content of unburned carbon, in a case of using this as an admixture for concrete, it is difficult to generate a black spot. It is preferable that the obtained coal ash has an ignition loss reduced by 10.0% or more, as compared to the ignition loss of the coal ash before the classification, but it is not limited thereto. Further, since the obtained coal ash mainly includes fine coal ash particles each having a particle diameter of 45 μm or less, in a case of using this as an admixture for concrete, an activity index increases. The coal ash obtained by the present embodiment usually has the same quality as that of fly ash II specified in JIS A 6201 (fly ash for use in concrete).

In addition, in the present embodiment, since the classification is performed by using the forced vortex centrifugal type classifying apparatus, under the condition that the residue on a 45 μm sieve of the coal ash after the classifying becomes 1% by mass or more and 8% by mass or less, the recovery rate of the coal ash in which a content of unburned carbon is reduced is high and the amount of unburned carbon in the coal ash can be efficiently reduced.

Further, in the present embodiment, in the coal ash before the classification, since the residue on a 45 μm sieve is 40% by mass or less and the compression degree is 40% or less, the recovery rate of the coal ash in which the content of unburned carbon is reduced is high, and the amount of the unburned carbon in the coal ash can be efficiently reduced. In addition, in the coal ash before the classification, since the L value of lightness index in the Hunter Lab color system is 54.0 or more and the ignition loss is 5.0% by mass or less, the amount of unburned carbon of the obtained coal ash is further reduced. Therefore, it can be used advantageously as an admixture for concrete.

Hereinbefore, a description has been given of the embodiments of the present invention. However, the present invention is not limited thereto, and approximate modifications can be made in a range not departing from the technical spirit of the invention.

For example, in the embodiment, coal ash after the classifying (after reforming) may be used in applications other than the admixture for concrete. In this case, in the coal ash before the classification, it is not necessary that the residue on a 45 μm sieve is in a range of 10% by mass or more and 40% by mass or less, the compression degree is 40% or less, the L value of lightness index in a Hunter Lab color system is 54.0 or more, and the ignition loss is 5.0% by mass or less. However, in the coal ash before the classification, it is necessary that the residue on a 45 μm sieve is 10% by mass or more.

EXAMPLES

Hereinafter, results of an evaluation test of evaluating the method for reforming coal ash and the method for producing fly ash for a concrete admixture according to the present invention will be described.

Examples 1 to 3 and Comparative Examples 1 to 9

As the coal ash (before the classification), the following coal ash A to C were prepared.

Coal ash A: residue on a 45 μm sieve: 39% by mass, compression degree: 35%, and ignition loss: 3.5% by mass Coal ash B: residue on a 45 μm sieve: 40% by mass, compression degree: 40%, and ignition loss: 5.0% by mass Coal ash C: residue on a 45 μm sieve: 41% by mass, compression degree: 41%, and ignition loss: 2.0% by mass The residue on a 45 μm sieve and the ignition loss were measured according to the method described in JIS A 6201 (fly ash for use in concrete).

The loose apparent specific gravity and the packed apparent specific gravity were measured using a powder tester (manufactured by Hosokawa Micron Corporation) and the compression degree was calculated from the equation.

In addition, as a classifying apparatus, the following classification type classifying apparatus was prepared.

Forced vortex centrifugal type classifying apparatus: Turbo Classifier, manufactured by Nisshin Engineering Co., Ltd.

Semi-free vortex centrifugal type classifying apparatus: Micro classifier, manufactured by Seishin Co., Ltd.

Free vortex centrifugal type classifying apparatus: Cyclone, manufactured by Mitsubishi Materials Corporation Inertial type classifying apparatus: Elbow jet, manufactured by Matsubo Co., Ltd.

As shown in Table 1 below, the coal ash raw material was classified by using the classification type the classifying apparatus, and the classified coal ash was recovered. A classification condition was set as a condition that the residue on a 45 μm sieve of the classified coal ash became 1% by mass or more and 8% by mass or less.

After the classifying, a recovery rate (% by mass) of the coal ash was calculated by using the following equation.

Recovery rate (% by mass)=Weight of recovered coal ash/Weight of coal ash added to classifying apparatus×100

In addition, the index of classification accuracy (κ=d25/d75) of the coal ash after the classifying was determined as follows. The particle size distribution (under the sieve) of the coal ash after the classifying was measured by a laser diffraction particle size distribution analyzer (Microtrac particle size distribution analyzer manufactured by Nikkiso Co., Ltd., model: MT 3000 II). The obtained particle size distribution was divided into several particle size sections, partial classification efficiency was determined from the recovery rate for each particle size section, and a partial classification efficiency curve was created. A ratio between d25: 25% classification diameter and d75: 75% classification diameter (d25/d75) was set as the index of classification accuracy.

Further, in the recovered coal ash after the classifying, the residue on a 45 μm sieve and the ignition loss were measured. The results thereof are shown in Table 1 below.

TABLE 1

|  |  | Coal ash (before classification) |  |  |  |  |  | Coal ash after classification |  |
|---|---|---|---|---|---|---|---|---|---|
|  | Kind | Residue on 45 μm sieve (% by mass) | Compression degree (%) | Ignition loss (% by mass) | Classification type classifier | Recovery rate (% by mass) | Index of classification accuracy | Residue on 45 μm sieve (% by mass) | Ignition loss (% by mass) |
| Example 1 | A | 39 | 35 | 3.5 | Forced vortex centrifugal type | 75 | 0.628 | 5.1 | 3.1 |
| Example 2 | B | 40 | 40 | 5.0 | Forced vortex centrifugal type | 72 | 0.650 | 5.3 | 4.6 |
| Example 3 | C | 41 | 41 | 2.0 | Forced vortex centrifugal type | 55 | 0.631 | 6.2 | 1.8 |
| Comparative Example 1 | A | 39 | 35 | 3.5 | Semi-free vortex centrifugal type | 46 | 0.311 | 6.0 | 3.5 |
| Comparative Example 2 | B | 40 | 40 | 5.0 | Semi-free vortex centrifugal type | 45 | 0.321 | 5.8 | 4.9 |
| Comparative Example 3 | C | 41 | 41 | 2.0 | Semi-free vortex centrifugal type | 42 | 0.333 | 6.9 | 2.1 |
| Comparative Example 4 | A | 39 | 35 | 3.5 | Free vortex centrifugal type | 44 | 0.304 | 4.6 | 3.4 |
| Comparative Example 5 | B | 40 | 40 | 5.0 | Free vortex centrifugal type | 42 | 0.289 | 4.8 | 4.9 |
| Comparative Example 6 | C | 41 | 41 | 2.0 | Free vortex centrifugal type | 40 | 0.280 | 7.9 | 2.0 |
| Comparative Example 7 | A | 39 | 35 | 3.5 | Inertia type | 39 | 0.331 | 4.8 | 3.4 |

TABLE 1-continued

| | | Coal ash (before classification) | | | | Coal ash after classification | | |
|---|---|---|---|---|---|---|---|---|
| | Kind | Residue on 45 μm sieve (% by mass) | Compression degree (%) | Ignition loss (% by mass) | Classification type classifier | Recovery rate (% by mass) | Index of classification accuracy | Residue on 45 μm sieve (% by mass) | Ignition loss (% by mass) |
| Comparative Example 8 | B | 40 | 40 | 5.0 | Inertia type | 40 | 0.321 | 5.0 | 4.8 |
| Comparative Example 9 | C | 41 | 41 | 2.0 | Inertia type | 36 | 0.341 | 6.5 | 1.9 |

From the results in Table 1, in a case of using the same coal ash, it was confirmed that the recovery rate and the index of classification accuracy ($\kappa = d25/d75$) of the coal ash after the classifying in Examples 1 to 3 in which classification was performed by using the forced vortex centrifugal type classifying apparatus were significantly higher than those of Comparative Examples 1 to 9 in which classification was performed by using other types of classifying apparatus.

Examples 4 to 7 and Comparative Examples 10 and 11

As the coal ash (before the classification), the following coal ash D to H were prepared.

Coal ash D: residue on a 45 μm sieve: 21% by mass, compression degree: 38%, L value of lightness index: 62.0, and ignition loss: 2.1% by mass Coal ash E: residue on a 45 μm sieve: 38% by mass, compression degree: 37%, L value of lightness index: 54.0, and ignition loss: 5.0% by mass Coal ash F: residue on a 45 μm sieve: 23% by mass, compression degree: 35%, L value of lightness index: 53.7, and ignition loss: 4.6% by mass Coal ash G: residue on a 45 μm sieve: 22% by mass, compression degree: 39%, L value of lightness index: 55.1, and ignition loss: 5.2% by mass Coal ash H: residue on a 45 μm sieve: 30% by mass, compression degree: 34%, L value of lightness index: 53.9, and ignition loss: 5.8% by mass The L value of lightness index was measured by using a colorimetric color difference meter (manufactured by Nippon Denshoku Kogyo Co., Ltd., model: ZE 2000).

As shown in Table 2 below, the coal ash D to H were classified by using the forced vortex centrifugal type classifying apparatus (turbo classifier, manufactured by Nisshin Engineering Co., Ltd.), and the classified coal ash was recovered.

In Examples 4 to 7 and Comparative Examples 14, 17, and 19, classification conditions were set as conditions that the residue on a 45 μm sieve of the coal ash after the classifying became in a range of 1% by mass or more and 8% by mass or less and the index of classification accuracy became in a range of 0.6 or more and 0.7 or less. In Comparative Examples 10, 12, and 16, conditions were set such that the residue on a 45 μm sieve of the coal ash after the classifying exceeded 8% by mass and the index of classification accuracy became in the range of 0.6 or more and 0.7 or less. In Comparative Examples 11, 13, 15, and 18, conditions were set such that the residue on a 45 μm sieve of the coal ash after the classifying was less than 1% by mass, and the index of classification accuracy became in the range of 0.6 or more and 0.7 or less.

For the coal ash after the classifying, the recovery rate, the residue on a 45 sieve, and the ignition loss were measured. Results thereof are shown in Table 2. In addition, as a quality evaluation of the coal ash after the classifying as an admixture for concrete, the presence or absence of a black spot in mortar specimen using the coal ash after the classifying and the activity index of the coal ash after the classifying were measured by the following method. The results thereof are shown in Table 2.

Presence or Absence of Black Spot in Mortar Specimen Using Coal Ash after Classifying The mortar specimen was produced by a method according to the method described in JIS R 5201 (Physical testing methods for cement). The presence or absence of a black substance floating on a surface of the prepared mortar specimen was visually observed, and those with no black spot are indicated as "A", and those with even one black spot are indicated as "B".

Activity Index of Coal Ash after Classifying

The activity index was measured according to the method described in JIS A 6201 (fly ash for use in concrete). Those of which an activity index at a material age of 7 days was 70% or more, an activity index at a material age of 28 days was 80% or more, and an activity index at a material age of 91 days was 90% or more are indicated as "A", and the others are indicated as "B".

TABLE 2

| | Coal ash (before classification) | | | | | Recovery rate (% by mass) | Index of classification accuracy | Coal ash after classification | | Quality evaluation as concrete admixture | |
|---|---|---|---|---|---|---|---|---|---|---|---|
| | Kind | Residue on 45 μm sieve (% by mass) | Compression degree (%) | L value of lightness index | Ignition loss (% by mass) | | | Residue on 45 μm sieve (% by mass) | Ignition loss (% by mass) | Presence or absence of black spot | Activity index |
| Example 4 | D | 21 | 38 | 62.0 | 2.1 | 78 | 0.630 | 6.2 | 1.9 | A | A |
| Example 5 | D | 21 | 38 | 62.0 | 2.1 | 72 | 0.631 | 4.6 | 1.8 | A | A |
| Example 6 | E | 38 | 37 | 54.0 | 5.0 | 75 | 0.645 | 4.3 | 4.5 | A | A |
| Example 7 | E | 38 | 37 | 54.0 | 5.0 | 80 | 0.666 | 6.8 | 4.5 | A | A |

TABLE 2-continued

|  |  | Coal ash (before classification) | | | | Recovery rate (% by mass) | Index of classification accuracy | Coal ash after classification | | Quality evaluation as concrete admixture | |
| --- | --- | --- | --- | --- | --- | --- | --- | --- | --- | --- | --- |
|  | Kind | Residue on 45 μm sieve (% by mass) | Compression degree (%) | L value of lightness index | Ignition loss (% by mass) |  |  | Residue on 45 μm sieve (% by mass) | Ignition loss (% by mass) | Presence or absence of black spot | Activity index |
| Comparative Example 10 | D | 20 | 38 | 62.0 | 2.1 | 89 | 0.621 | 8.5 | 2.1 | A | B |
| Comparative Example 11 | D | 20 | 38 | 62.0 | 2.1 | 45 | 0.650 | 0.6 | 1.2 | A | A |
| Comparative Example 12 | E | 26 | 37 | 54.0 | 5.0 | 93 | 0.631 | 9.2 | 5.1 | A | B |
| Comparative Example 13 | E | 26 | 37 | 54.0 | 5.0 | 52 | 0.648 | 0.7 | 3.8 | A | A |
| Comparative Example 14 | F | 23 | 35 | 53.7 | 4.6 | 75 | 0.680 | 5.6 | 4.4 | B | A |
| Comparative Example 15 | F | 23 | 35 | 53.7 | 4.6 | 42 | 0.661 | 0.8 | 4.3 | B | A |
| Comparative Example 16 | F | 23 | 35 | 53.7 | 4.6 | 90 | 0.611 | 8.8 | 4.8 | B | B |
| Comparative Example 17 | G | 22 | 39 | 55.1 | 5.2 | 77 | 0.627 | 4.7 | 5.1 | A | B |
| Comparative Example 18 | G | 22 | 39 | 55.1 | 5.2 | 37 | 0.671 | 0.7 | 4.5 | A | A |
| Comparative Example 19 | H | 30 | 34 | 53.9 | 5.8 | 65 | 0.610 | 2.6 | 5.6 | B | B |

From the results in Table 2, it can be seen that, in Examples 4 to 7 in which coal ash in which the residue on a 45 μm sieve, the compression degree, the L value of lightness index, and the ignition loss were in the range of the present invention was classified by using the forced vortex centrifugal type classifying apparatus, under the classification conditions that the residue on a 45 μm sieve of coal ash after the classifying was in a range of 1% by mass or more and 8% by mass or less and the index of classification accuracy was 0.6 or more and 0.7 or less, it is possible to obtain coal ash, in which the residue on a 45 μm sieve of the coal ash after the classifying was low as in a range of 1% by mass or more and 8% by mass or less and the ignition loss was reduced compared to that before the classification, at a high recovery rate of 70% by mass or more. Thus, in the obtained coal ash (Examples 4 to 7), a black spot was not generated even in a case of being added to mortar, and the activity index was high. The coal ash obtained in Examples 4 to 7 corresponds to the fly ash II.

On the contrary, in Comparative Examples 10 and 12 in which coal ash in which the residue on a 45 μm sieve, the compression degree, the L value of lightness index, and the ignition loss were in the range of the present invention was classified under the condition that the residue on a 45 μm sieve of coal ash after the classifying exceeded 8% by mass, the obtained coal ash after the classifying included a large amount of the residue on a 45 μm sieve and the ignition loss was not reduced. Then, the activity index was low and it was not enough to be used as a concrete admixture.

In Comparative Examples 11 and 13 in which coal ash in which the residue on a 45 μm sieve, the compression degree, the L value of lightness index, and the ignition loss were in the range of the present invention was classified under the condition that the residue on a 45 μm sieve of coal ash after the classifying was less than 1% by mass, recovery rate was low.

In Comparative Examples 14, 15, and 16 in which coal ash in which the L value of lightness index was smaller than the range of the present invention was used, a black spot was generated on the mortar specimen. Further, in Comparative Example 16 in which the classification is carried out under the condition that the residue on a 45 μm sieve of coal ash after the classifying exceeds 8% by mass, the coal ash after the classifying had a high ignition loss and a low activity index.

In Comparative Example 17 in which coal ash in which the ignition loss was higher than the range of the present invention was used, the coal ash after the classifying had a high ignition loss and a low activity index. In Comparative Examples 18 in which coal ash in which the ignition loss was higher than the range of the present invention was classified under the condition that the residue on a 45 μm sieve of the coal ash after the classifying was less than 1% by mass, the ignition loss was reduced but the recovery rate was low.

In Comparative Example 19 in which coal ash in which the L value of lightness index was smaller than the range of the present invention and the ignition loss was higher was used, a black spot was generated on the mortar specimen and the activity index was low.

From the above evaluation results, it was confirmed that, according to the present invention, it is possible to efficiently reduce the amount of unburned carbon in coal ash, by using a relatively simple apparatus.

INDUSTRIAL APPLICABILITY

According to the method for reforming coal ash of the present invention, it is possible to efficiently reduce the amount of unburned carbon in coal ash. In addition, according to the method for producing fly ash for a concrete admixture of the present invention, it is possible to efficiently produce fly ash for a concrete admixture from coal ash.

The invention claimed is:
1. A method for reforming coal ash, the method comprising:
classifying coal ash having 10% by mass or more of a residue on a 45 μm sieve by using a forced vortex centrifugal type classifying apparatus, under a condi- tion that a content of the residue on the 45 µm sieve after the classifying is in a range of 1% by mass or more and 8% by mass or less.

2. The method according to claim 1, wherein before the classifying, the residue in the coal ash on a 45 µm sieve is 40% by mass or less, a compression degree is 40% or less, a L value of lightness index in a Hunter Lab color system is 54.0 or more, and an ignition loss is 5.0% by mass or less.

3. The method according to claim 1, wherein the classifying is carried out under a condition that an index of classification accuracy as calculated by κ=d25/d75 is 0.6 or more and 0.7 or less.

4. The method according to claim 1,
wherein the coal ash after the classifying has an ignition loss reduced by 8.0% or more, as compared to an ignition loss of the coal ash before the classification.

5. A method for producing fly ash for a concrete admixture, the method comprising:
classifying coal ash, in which a residue on a 45 µm sieve is in a range of 10% by mass or more and 40% by mass or less, a compression degree is 40% or less, a L value of lightness index in a Hunter Lab color system is 54.0 or more, and an ignition loss is 5.0% by mass or less, by using a forced vortex centrifugal type classifying apparatus, under a condition that a content of the residue on the 45 µm sieve after the classifying is in a range of 1% by mass or more and 8% by mass or less.

* * * * *